(12) United States Patent
Hornbostel

(10) Patent No.: US 8,547,783 B2
(45) Date of Patent: Oct. 1, 2013

(54) METHOD AND APPARATUS FOR EVALUATING SUBMARINE FORMATIONS

(75) Inventor: Scott C. Hornbostel, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 848 days.

(21) Appl. No.: 12/681,875

(22) PCT Filed: Oct. 30, 2008

(86) PCT No.: PCT/US2008/081824
§ 371 (c)(1),
(2), (4) Date: Apr. 6, 2010

(87) PCT Pub. No.: WO2009/075961
PCT Pub. Date: Jun. 18, 2009

(65) Prior Publication Data
US 2010/0238762 A1    Sep. 23, 2010

Related U.S. Application Data

(60) Provisional application No. 61/007,404, filed on Dec. 12, 2007.

(51) Int. Cl.
*G01V 1/38* (2006.01)
*G01V 1/20* (2006.01)
*G01V 3/08* (2006.01)

(52) U.S. Cl.
CPC .............. *G01V 1/3817* (2013.01); *G01V 1/20* (2013.01); *G01V 3/083* (2013.01); *G01V 2003/085* (2013.01)
USPC .......................................... 367/20

(58) Field of Classification Search
CPC ........ G01V 1/20; G01V 3/083; G01V 1/3817
USPC .......................................... 367/20
See application file for complete search history.

(56) References Cited

U.S. PATENT DOCUMENTS

| | | | | |
|---|---|---|---|---|
| 2,745,507 | A | * | 5/1956 | Bodine, Jr. .................. 367/189 |
| 3,383,651 | A | * | 5/1968 | Koblick ...................... 367/127 |
| 4,033,278 | A | | 7/1977 | Waters |
| 4,405,036 | A | * | 9/1983 | Wener et al. ................. 181/110 |

(Continued)

FOREIGN PATENT DOCUMENTS

| | | |
|---|---|---|
| EP | 0 562 780 | 8/1996 |
| EP | 1 746 443 | 1/2007 |

(Continued)

OTHER PUBLICATIONS

*European Search Report*, dated Sep. 30, 2008.

(Continued)

*Primary Examiner* — Mark Hellner
*Assistant Examiner* — Ari M Diacou
(74) *Attorney, Agent, or Firm* — ExxonMobil Upstream Research Company Law Dept.

(57) ABSTRACT

A method and apparatus for evaluating submarine formations, such as geological formations located generally under a body of water. Multiple hydrofoils (130), responding to moving water, hydrodynamic, or Bernoulli forces, provide controllable orientation and separation for multiple receivers (135) as they are towed (125) through water (110) in the course of a geophysical survey such as a controlled source electromagnetic survey. The inventive method can be used to provide mutual orthogonality for three antennas in a multiple component electromagnetic receiver.

18 Claims, 11 Drawing Sheets

(56) References Cited

U.S. PATENT DOCUMENTS

| | | | |
|---|---|---|---|
| 4,558,437 A * | 12/1985 | Meeder et al. | 367/15 |
| 4,617,518 A | 10/1986 | Srnka | |
| 4,742,305 A | 5/1988 | Stolarczyk | |
| 4,792,761 A | 12/1988 | King et al. | |
| 4,831,383 A | 5/1989 | Ohnishi et al. | |
| 4,875,015 A | 10/1989 | Ward | |
| 5,050,129 A | 9/1991 | Schultz | |
| 5,175,500 A | 12/1992 | McNeill | |
| 5,189,644 A | 2/1993 | Wood | |
| 5,210,691 A | 5/1993 | Freedman et al. | |
| 5,265,192 A | 11/1993 | McCormack | |
| 5,357,893 A | 10/1994 | Ruffa | |
| 5,373,443 A | 12/1994 | Lee et al. | |
| 5,406,206 A | 4/1995 | Safinya et al. | |
| 5,467,018 A | 11/1995 | Ruter et al. | |
| 5,563,513 A | 10/1996 | Tasci et al. | |
| 5,594,343 A | 1/1997 | Clark et al. | |
| 5,677,893 A | 10/1997 | Hoop et al. | |
| 5,706,194 A | 1/1998 | Neff et al. | |
| 5,717,655 A | 2/1998 | Beasley | |
| 5,719,821 A | 2/1998 | Sallas et al. | |
| 5,764,515 A | 6/1998 | Guerillot et al. | |
| 5,770,945 A | 6/1998 | Constable | |
| 5,825,188 A | 10/1998 | Montgomery et al. | |
| 5,835,883 A | 11/1998 | Neff et al. | |
| 5,841,733 A | 11/1998 | Bouyoucos et al. | |
| 5,852,588 A | 12/1998 | De Hoop et al. | |
| 5,884,227 A | 3/1999 | Rabinovich et al. | |
| 5,905,657 A | 5/1999 | Celniker | |
| 5,924,049 A | 7/1999 | Beasley | |
| 5,999,488 A | 12/1999 | Smith | |
| 5,999,489 A | 12/1999 | Lazaratos | |
| 6,014,342 A | 1/2000 | Lazaratos | |
| 6,018,493 A * | 1/2000 | Buckingham | 367/16 |
| 6,021,094 A | 2/2000 | Ober | |
| 6,028,818 A | 2/2000 | Jeffryes | |
| 6,037,776 A | 3/2000 | McGlone | |
| 6,049,760 A | 4/2000 | Scott | |
| 6,058,073 A | 5/2000 | VerWest | |
| 6,088,656 A | 7/2000 | Ramakrishnan et al. | |
| 6,094,400 A | 7/2000 | Ikelle | |
| 6,101,448 A | 8/2000 | Ikelle et al. | |
| 6,115,670 A | 9/2000 | Druskin et al. | |
| 6,125,330 A | 9/2000 | Robertson et al. | |
| 6,138,075 A | 10/2000 | Yost | |
| 6,181,138 B1 | 1/2001 | Hagiwara et al. | |
| 6,253,100 B1 | 6/2001 | Zhdanov | |
| 6,253,627 B1 | 7/2001 | Lee et al. | |
| 6,256,587 B1 | 7/2001 | Jericevic et al. | |
| 6,278,948 B1 | 8/2001 | Jorgensen et al. | |
| 6,304,086 B1 | 10/2001 | Minerbo et al. | |
| 6,311,132 B1 | 10/2001 | Rosenquist et al. | |
| 6,311,133 B1 | 10/2001 | Lailly | |
| 6,317,695 B1 | 11/2001 | Zhou | |
| 6,327,537 B1 | 12/2001 | Ikelle | |
| 6,332,109 B1 | 12/2001 | Sheard et al. | |
| 6,339,333 B1 | 1/2002 | Kuo | |
| 6,374,201 B1 | 4/2002 | Grizon et al. | |
| 6,393,363 B1 | 5/2002 | Wilt et al. | |
| 6,424,918 B1 | 7/2002 | Jorgensen et al. | |
| 6,430,507 B1 | 8/2002 | Jorgensen et al. | |
| 6,466,021 B1 | 10/2002 | MacEnany | |
| 6,470,274 B1 | 10/2002 | Mollison et al. | |
| 6,476,609 B1 | 11/2002 | Bittar | |
| 6,493,632 B1 | 12/2002 | Mollison et al. | |
| 6,502,037 B1 | 12/2002 | Jorgensen et al. | |
| 6,522,973 B1 | 2/2003 | Tonellot et al. | |
| 6,529,833 B2 | 3/2003 | Fanini et al. | |
| 6,533,627 B1 | 3/2003 | Ambs | |
| 6,534,986 B2 | 3/2003 | Nichols | |
| 6,545,944 B2 | 4/2003 | De Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,594,584 B1 | 7/2003 | Omeragic et al. | |
| 6,628,119 B1 | 9/2003 | Eidesmo et al. | |
| 6,662,147 B1 | 12/2003 | Fournier et al. | |
| 6,665,615 B2 | 12/2003 | Van Riel et al. | |
| 6,671,623 B1 | 12/2003 | Li | |
| 6,675,097 B2 | 1/2004 | Routh et al. | |
| 6,686,736 B2 | 2/2004 | Schoen et al. | |
| 6,687,619 B2 | 2/2004 | Moerig et al. | |
| 6,687,659 B1 * | 2/2004 | Shen | 703/2 |
| 6,704,245 B2 | 3/2004 | Becquey | |
| 6,711,502 B2 | 3/2004 | Mollison et al. | |
| 6,714,867 B2 | 3/2004 | Meunier | |
| 6,724,192 B1 | 4/2004 | McGlone | |
| 6,739,165 B1 | 5/2004 | Strack | |
| 6,754,590 B1 | 6/2004 | Moldoveanu | |
| 6,765,383 B1 | 7/2004 | Barringer | |
| 6,766,256 B2 | 7/2004 | Jeffryes | |
| 6,813,566 B2 | 11/2004 | Hartley | |
| 6,816,787 B2 | 11/2004 | Ramamoorthy et al. | |
| 6,826,486 B1 | 11/2004 | Malinverno | |
| 6,836,448 B2 | 12/2004 | Robertsson et al. | |
| 6,842,006 B2 * | 1/2005 | Conti et al. | 324/350 |
| 6,842,400 B2 | 1/2005 | Blanch et al. | |
| 6,842,701 B2 | 1/2005 | Moerig et al. | |
| 6,846,133 B2 | 1/2005 | Martin et al. | |
| 6,859,734 B2 | 2/2005 | Bednar | |
| 6,865,488 B2 | 3/2005 | Moerig et al. | |
| 6,876,725 B2 | 4/2005 | Rashid-Farrokhi et al. | |
| 6,876,928 B2 | 4/2005 | Van Riel et al. | |
| 6,882,938 B2 | 4/2005 | Vaage | |
| 6,883,452 B1 | 4/2005 | Gieseke | |
| 6,888,623 B2 | 5/2005 | Clements | |
| 6,901,029 B2 | 5/2005 | Raillon et al. | |
| 6,901,333 B2 | 5/2005 | Van Riel et al. | |
| 6,903,999 B2 | 6/2005 | Curtis et al. | |
| 6,914,433 B2 | 7/2005 | Wright et al. | |
| 6,947,843 B2 | 9/2005 | Fisher et al. | |
| 6,950,747 B2 | 9/2005 | Byerly | |
| 6,957,708 B2 | 10/2005 | Chemali et al. | |
| 6,958,610 B2 | 10/2005 | Gianzero | |
| 6,985,403 B2 | 1/2006 | Nicholson | |
| 6,993,433 B2 | 1/2006 | Chavarria et al. | |
| 6,999,880 B2 | 2/2006 | Lee | |
| 7,002,349 B2 | 2/2006 | Barringer | |
| 7,002,350 B1 | 2/2006 | Barringer | |
| 7,023,213 B2 | 4/2006 | Nichols | |
| 7,038,456 B2 | 5/2006 | Ellingsrud et al. | |
| 7,039,525 B2 | 5/2006 | Mittet | |
| 7,046,581 B2 | 5/2006 | Calvert | |
| 7,050,356 B2 | 5/2006 | Jeffryes | |
| 7,062,072 B2 | 6/2006 | Anxionnaz et al. | |
| 7,072,767 B2 | 7/2006 | Routh et al. | |
| 7,092,315 B2 | 8/2006 | Olivier | |
| 7,092,823 B2 | 8/2006 | Lailly et al. | |
| 7,109,717 B2 | 9/2006 | Constable | |
| 7,113,869 B2 | 9/2006 | Xue | |
| 7,114,565 B2 | 10/2006 | Estes et al. | |
| 7,116,108 B2 | 10/2006 | Constable | |
| 7,126,338 B2 | 10/2006 | MacGregor et al. | |
| 7,142,986 B2 | 11/2006 | Moran | |
| 7,187,569 B2 | 3/2007 | Sinha et al. | |
| 7,191,063 B2 | 3/2007 | Tompkins | |
| 7,203,599 B1 | 4/2007 | Strack et al. | |
| 7,227,363 B2 | 6/2007 | Gianzero et al. | |
| 7,250,768 B2 | 7/2007 | Ritter et al. | |
| 7,257,049 B1 | 8/2007 | Laws et al. | |
| 7,262,399 B2 | 8/2007 | Hayashi et al. | |
| 7,262,602 B2 | 8/2007 | Meyer | |
| 7,271,747 B2 | 9/2007 | Baraniuk | |
| 7,307,424 B2 | 12/2007 | MacGregor et al. | |
| 7,337,064 B2 | 2/2008 | MacGregor et al. | |
| 7,347,271 B2 | 3/2008 | Ohmer et al. | |
| 7,356,412 B2 | 4/2008 | Tompkins | |
| 7,362,102 B2 | 4/2008 | Andreis | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,382,135 B2 | 6/2008 | Li et al. | |
| 7,400,977 B2 | 7/2008 | Alumbaugh et al. | |
| 7,411,399 B2 | 8/2008 | Reddig et al. | |

| | | |
|---|---|---|
| 7,453,763 B2 | 11/2008 | Johnstad |
| 7,456,632 B2 | 11/2008 | Johnstad et al. |
| 7,477,160 B2 | 1/2009 | Lemenager et al. |
| 7,482,813 B2 | 1/2009 | Constable et al. |
| 7,502,690 B2 | 3/2009 | Thomsen et al. |
| 7,536,262 B2 | 5/2009 | Hornbostel et al. |
| 7,542,851 B2 | 6/2009 | Tompkins |
| 7,584,056 B2 | 9/2009 | Koren |
| 7,602,670 B2 | 10/2009 | Jeffryes |
| 7,646,924 B2 | 1/2010 | Donoho |
| 7,659,721 B2 | 2/2010 | MacGregor et al. |
| 7,660,188 B2 | 2/2010 | Meldahl |
| 7,667,464 B2 | 2/2010 | Campbell |
| 7,672,194 B2 | 3/2010 | Jeffryes |
| 7,675,815 B2 * | 3/2010 | Saenger et al. ................. 367/38 |
| 7,679,990 B2 | 3/2010 | Herknehoff |
| 7,683,625 B2 | 3/2010 | Milne et al. |
| 7,822,552 B2 | 10/2010 | Bittleston |
| 7,884,612 B2 * | 2/2011 | Conti et al. ................... 324/365 |
| 7,928,732 B2 | 4/2011 | Nichols |
| 8,008,920 B2 | 8/2011 | Lu et al. |
| 8,099,239 B2 | 1/2012 | MacGregor et al. |
| 2002/0172329 A1 | 11/2002 | Rashid-Farrokhi et al. |
| 2005/0128874 A1 | 6/2005 | Herkenhoff et al. |
| 2005/0135189 A1* | 6/2005 | Wang ............................. 367/50 |
| 2005/0237063 A1 | 10/2005 | Wight et al. |
| 2005/0279268 A1 | 12/2005 | Storteig et al. |
| 2006/0186887 A1 | 8/2006 | Strack et al. |
| 2007/0150201 A1 | 6/2007 | Eidesmo et al. |
| 2007/0233437 A1 | 10/2007 | Manen et al. |
| 2007/0280047 A1 | 12/2007 | MacGregor et al. |
| 2007/0288211 A1 | 12/2007 | MacGregor et al. |
| 2008/0007265 A1 | 1/2008 | Milne et al. |
| 2008/0008920 A1 | 1/2008 | Alexandrovichserov et al. |
| 2008/0105425 A1 | 5/2008 | MacGregor et al. |
| 2008/0106265 A1 | 5/2008 | Campbell |
| 2008/0291779 A1* | 11/2008 | Muyzert et al. ................. 367/20 |
| 2008/0306692 A1 | 12/2008 | Singer et al. |
| 2008/0316860 A1* | 12/2008 | Muyzert et al. ................. 367/25 |
| 2009/0005997 A1 | 1/2009 | Willen |
| 2009/0067041 A1 | 3/2009 | Singer et al. |
| 2009/0204330 A1 | 8/2009 | Thomsen et al. |
| 2009/0243613 A1 | 10/2009 | Lu et al. |
| 2009/0306900 A1 | 12/2009 | Jing et al. |
| 2009/0309599 A1 | 12/2009 | Ziolkowski |
| 2010/0179761 A1 | 7/2010 | Burtz et al. |
| 2012/0125249 A1* | 5/2012 | Oxseth et al. ................. 114/253 |

FOREIGN PATENT DOCUMENTS

| | | |
|---|---|---|
| GB | 2 399 883 | 9/2004 |
| GB | 2 402 745 | 8/2005 |
| GB | 2 410 635 | 12/2006 |
| GB | 2 442 849 | 8/2008 |
| WO | WO 98/07050 | 2/1998 |
| WO | WO 03/048812 | 6/2003 |
| WO | WO 2004/053528 | 6/2004 |
| WO | WO 2004/109338 | 12/2004 |
| WO | WO 2006/052145 | 5/2006 |
| WO | WO 2006/059122 | 6/2006 |
| WO | WO 2006/073115 | 7/2006 |
| WO | WO 2008/008127 | 1/2008 |
| WO | WO 2008/054880 | 5/2008 |
| WO | WO 2008/062024 | 5/2008 |

OTHER PUBLICATIONS

*European Search Report*, dated Dec. 30, 2008.
*International Search Report and Written Opinion*, dated Jan. 12, 2009.
U.S. Pat. No. 6,522,146, filed Feb. 18, 2033, Srnka.

* cited by examiner

METHOD AND APPARATUS FOR EVALUATING SUBMARINE FORMATIONS

CROSS-REFERENCE TO RELATED APPLICATION

This application is a National Stage entry under 35 U.S.C. 371 of PCT/US2008/081824 that published as WO 2009/075961 and was filed on 30 Oct. 2008 and claims the benefit of now expired U.S. Provisional application 61/007,404, which was filed on 12 Dec. 2007.

FIELD

The following generally relates to petroleum exploration and more specifically to evaluating an underwater geological formation for drilling potential via towing detectors behind a boat in a beneficial orientation.

BACKGROUND

Certain geological formations contain petroleum that companies would like to extract. However, finding the formations that contain commercially viable petroleum reservoirs can be challenging. Even if a company knows the general location of a petroleum reservoir, determining preferred drilling sites, drilling depths, and extraction strategies can be difficult with conventional technologies. Compounding the situation, oil-bearing geological formations are often beneath the ocean or some other body of water.

The conventional technologies that are available for detecting petroleum and identifying geological structures relevant to petroleum extraction are particularly limited when the petroleum and geology are located underwater. Improved technologies are needed to evaluate underwater geology in support of placing petroleum wells and conducting other operations aimed at locating and obtaining petroleum.

The marine controlled source electromagnetic ("CSEM") geophysical survey method typically uses a towed bipole source and deployed ocean-bottom receivers for mapping sub-seafloor resistivity variations (for example, U.S. Pat. No. 6,522,146 to Srnka, PCT Patent Application Publication No. WO 2003/048812 (Macgregor and Sinha), U.S. Pat. No. 6,628,119 to Eidesmo et al., U.S. Pat. No. 5,770,945 to Constable, and PCT Patent Application Publication No. WO 2004/053528 (Constable)).

In some applications, however, a towed inline receiver can be deployed for improved efficiency; see, for example, U.S. Pat. No. 7,038,456 to Ellingsrud et al. The subsequent inversion of the electromagnetic data for earth resistivity (resistivity anomalies are hydrocarbon indicators) would be further improved if multi-component receivers could be used. The improvements would be even more substantial if a broadside source were also available. For this latter case, the additional receiver components (particularly the crossline component) essentially permit simultaneous collection of inline and broadside data in a towed-receiver configuration. This additional information improves the discrimination of resistive reservoirs from changes in background resistivity.

In U.S. Pat. No. 7,038,456, use of a towed receiver is disclosed including the possibility of a two-component receiver with the receivers inline and crossline to the tow direction. Positioning the two receiver components oblique to the tow direction is also mentioned. A two-component towed source with 90° phase difference between the components is discussed in PCT Patent Application Publication WO 2006/059122. This configuration would produce a circularly polarized source. The combination of the circularly polarized source with the at least two-component receiver would give the opportunity for the simultaneous collection of inline and broadside data.

PCT Patent Application Publication No. WO 2008/008127 discloses using adjustable vanes or wings to control position and orientation of a towed streamer of electromagnetic or seismic receivers.

SUMMARY

A geological formation located beneath an ocean or some other body of water can be evaluated for hydrocarbon or petroleum. In one aspect, the evaluation can proceed via moving a receiver system through the body of water, for example towing the receiver system behind a boat. The receiver system can include one or more sensors, detectors, receivers, electrodes, signal receptors, antennas, or other devices that can respond to signals in the water indicative of the geology. The signals can, for example, contain information about whether the formation contains a commercially viable amount of petroleum. Towing the receiver system in the water can produce relative motion between one or more surfaces of the receiver system and the water, thus generating hydrodynamic or Bernoulli force. For example, the receiver system can include one or more rudders, wings, lift surfaces, paravanes, fins, or curved members interacting with moving water in a manner that applies force or thrust to the receiver system. The applied force can move the receiver system (or components of the receiver system) into an orientation that facilitates detecting signals in the water. That is, water moving along a surface of the receiver system can create force that moves, orients, configures, or positions at least a portion of the receiver system to facilitate or improve signal detection. From such an orientation, the receiver system can acquire signals that can be processed to ascertain geological information relevant to drilling a well or to some other petroleum operation.

The discussion of evaluating underwater geological formations presented in this summary is for illustrative purposes only. Various aspects of the technology may be more clearly understood and appreciated from a review of the following detailed description of the disclosed embodiments and by reference to the drawings and the claims that follow. Moreover, other aspects, systems, methods, features, advantages, and objects will become apparent to one with skill in the art upon examination of the following drawings and detailed description. It is intended that all such aspects, systems, methods, features, advantages, and objects are to be included within this description and are to be protected by the accompanying claims.

Figure 1:
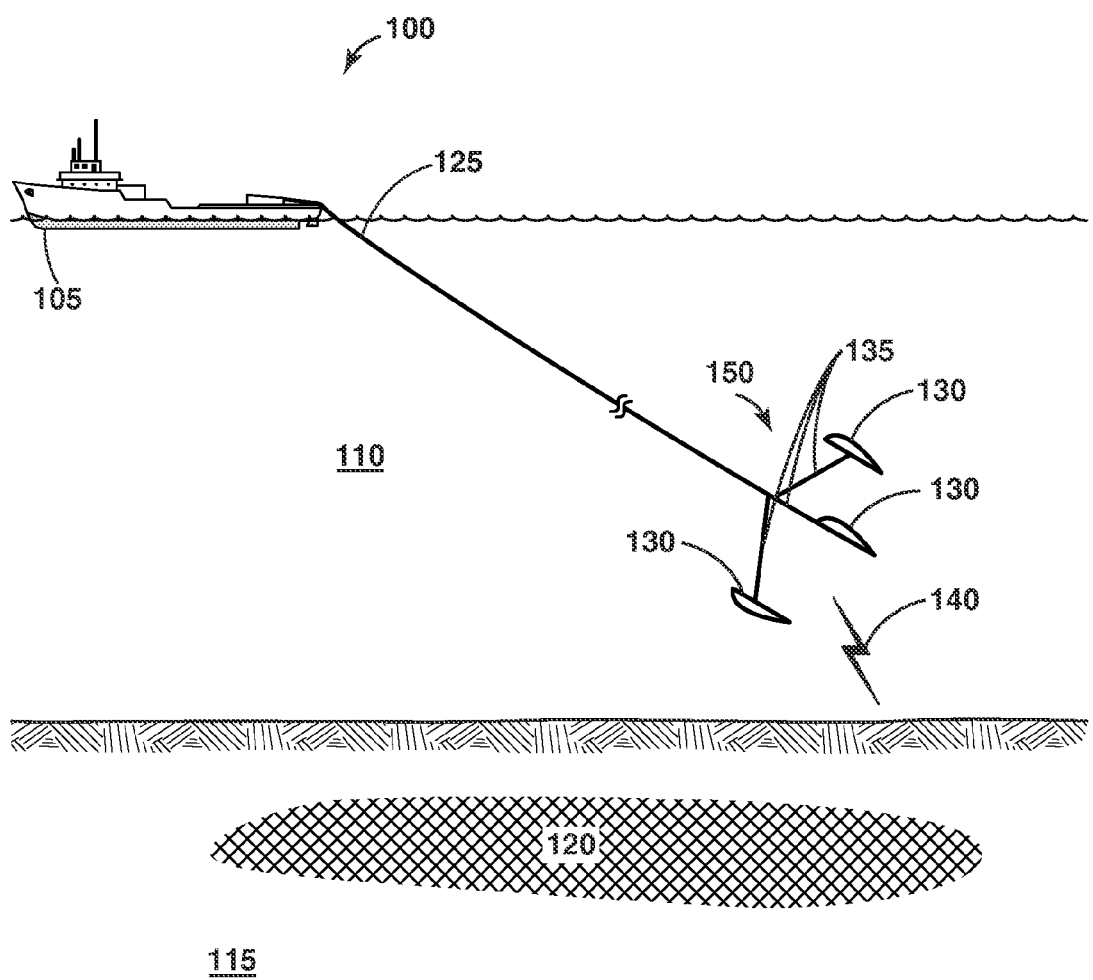
FIG. 1 is an illustration of an exemplary embodiment of a system for evaluating an underwater formation for hydrocarbon presence or petroleum extraction potential.

The elements and features shown in the drawings are not to scale, emphasis instead being placed upon clearly illustrating the principles of exemplary embodiments. Moreover, certain dimensions may be exaggerated to help visually convey such principles. In the drawings, reference numerals designate like or corresponding, but not necessarily identical, elements throughout the several views.

DETAILED DESCRIPTION OF THE ILLUSTRATIVE EMBODIMENTS

Figure 8:
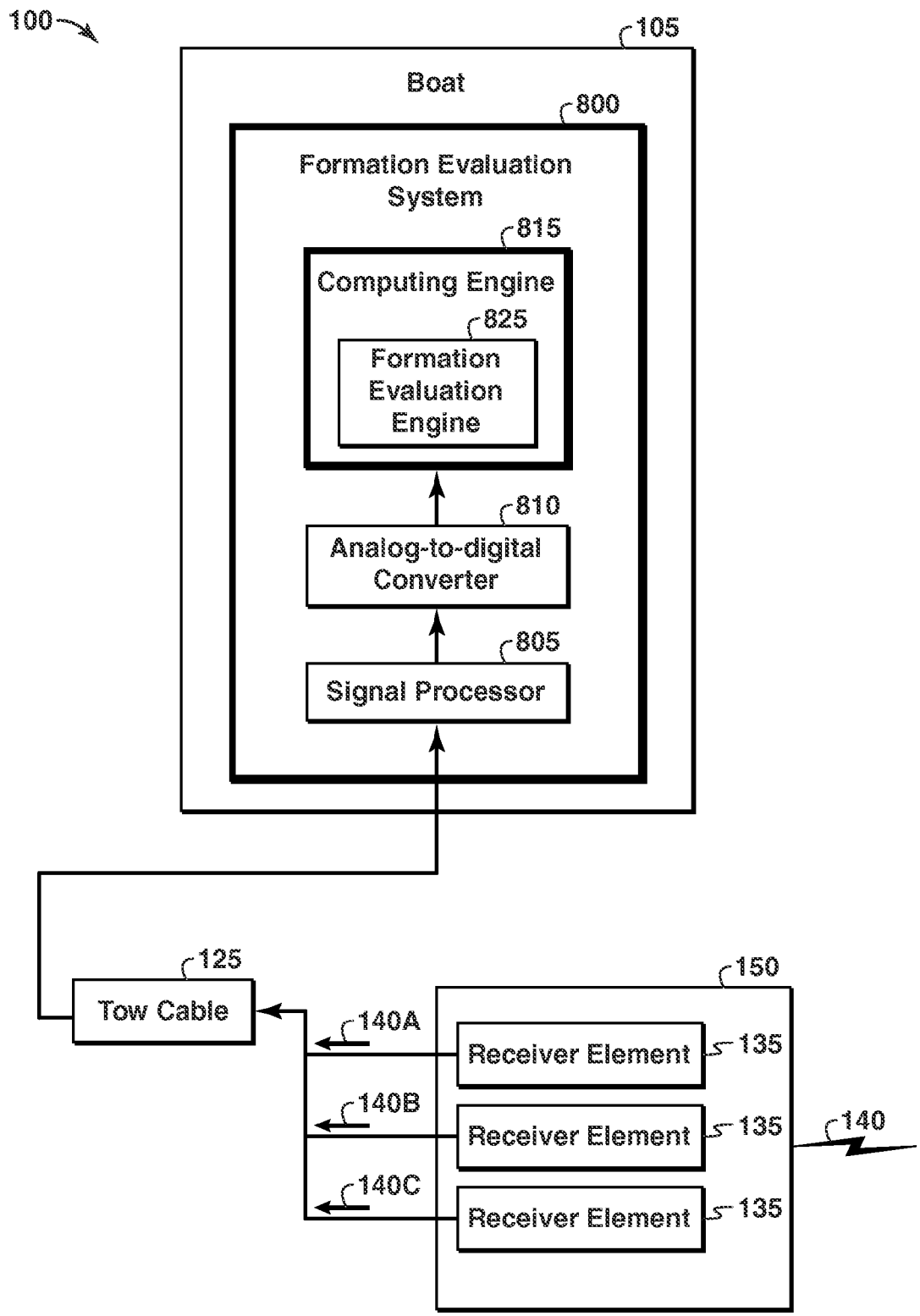
FIG. 8 is a functional block diagram of an exemplary embodiment of a system for evaluating an underwater formation for hydrocarbon presence or extraction potential.
Figure 9:
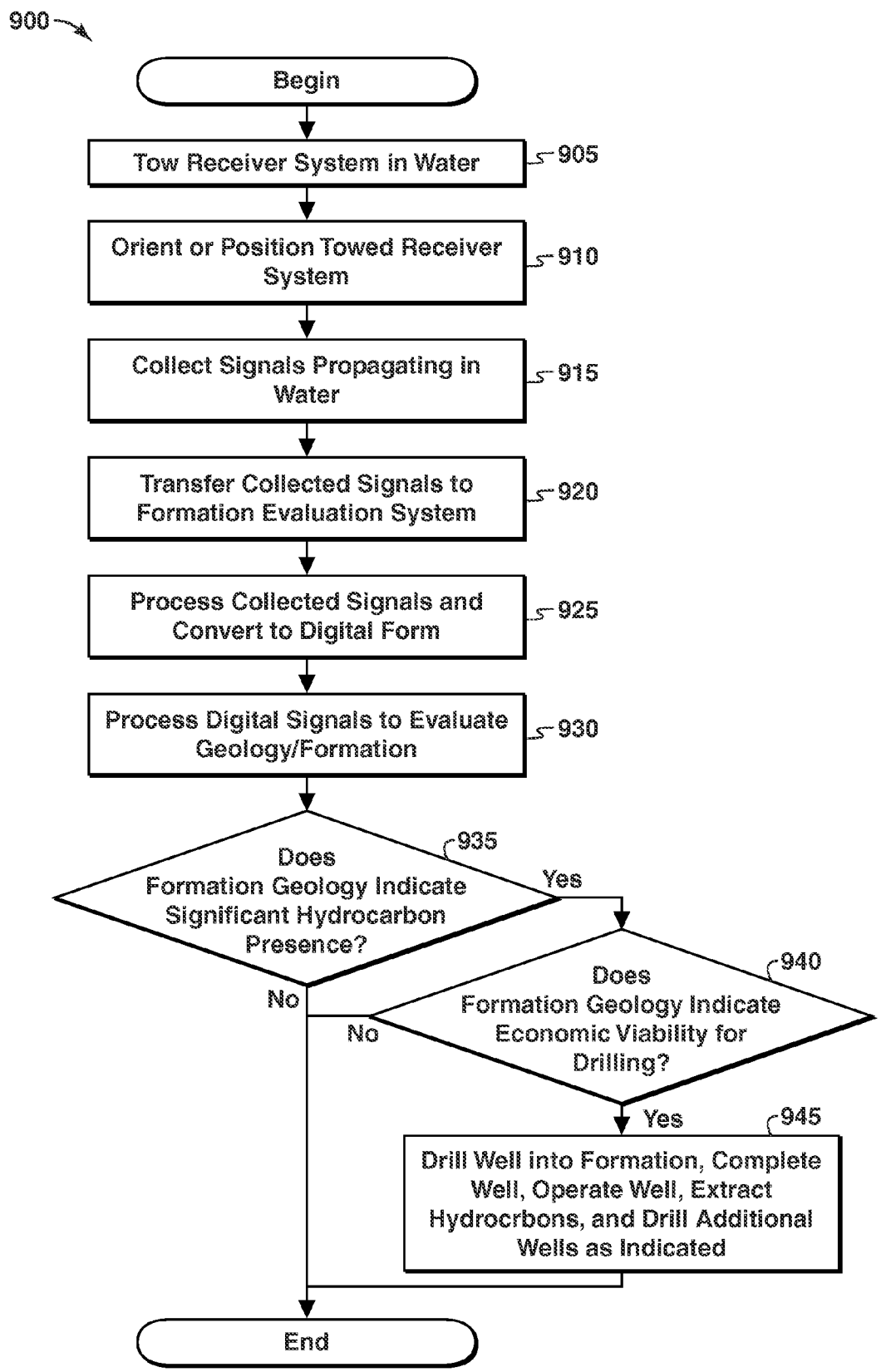
FIG. 9 is a flowchart illustration of an exemplary embodiment of a method for operating a system that evaluates an underwater formation for hydrocarbon presence or extraction potential.
Figure 10:
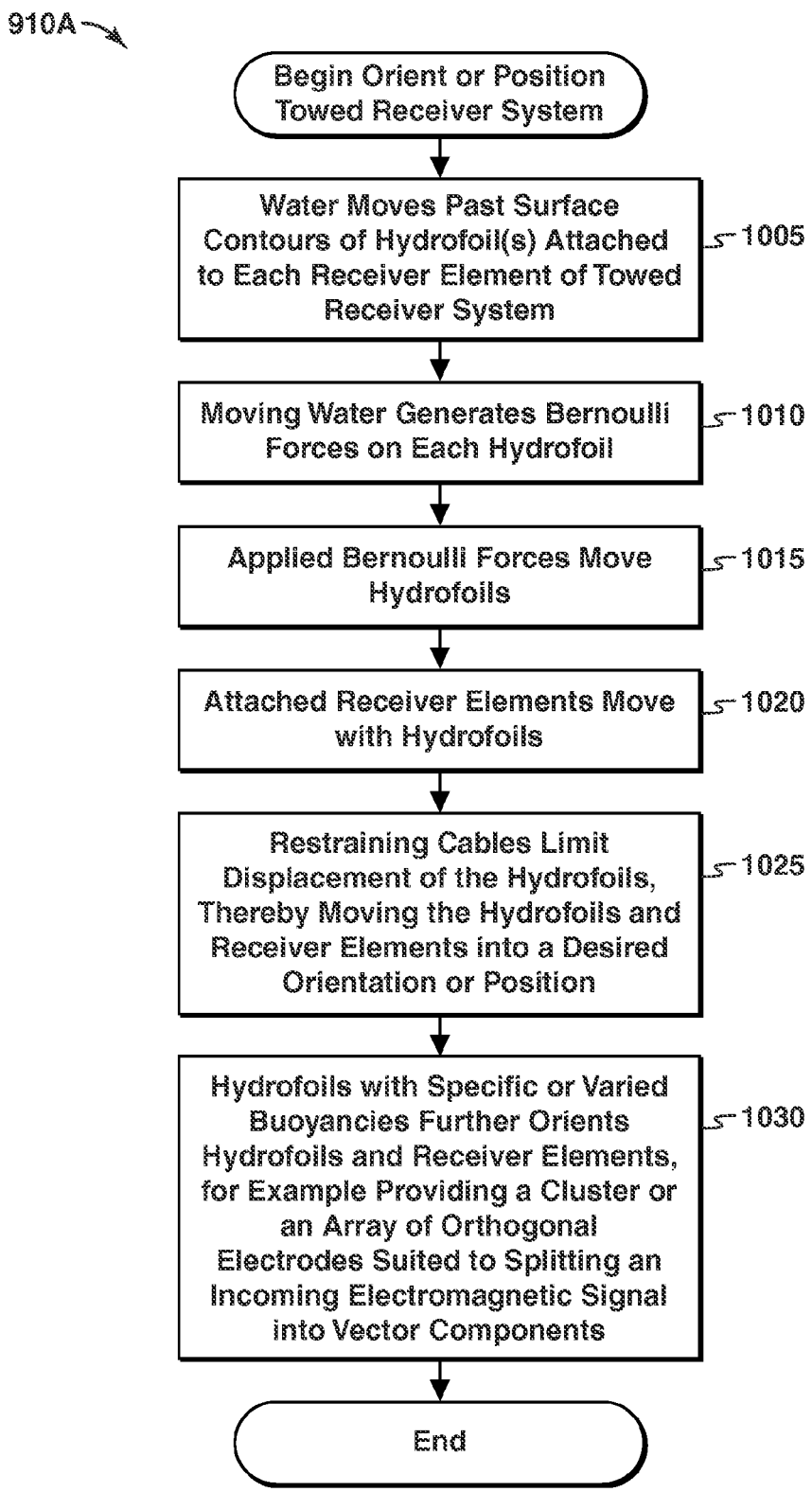
FIG. 10 is a flowchart illustration of an exemplary embodiment of a method for orienting or positioning receiver elements or electrodes of a system that evaluates an underwater formation for hydrocarbon presence or extraction potential.
Figure 11:
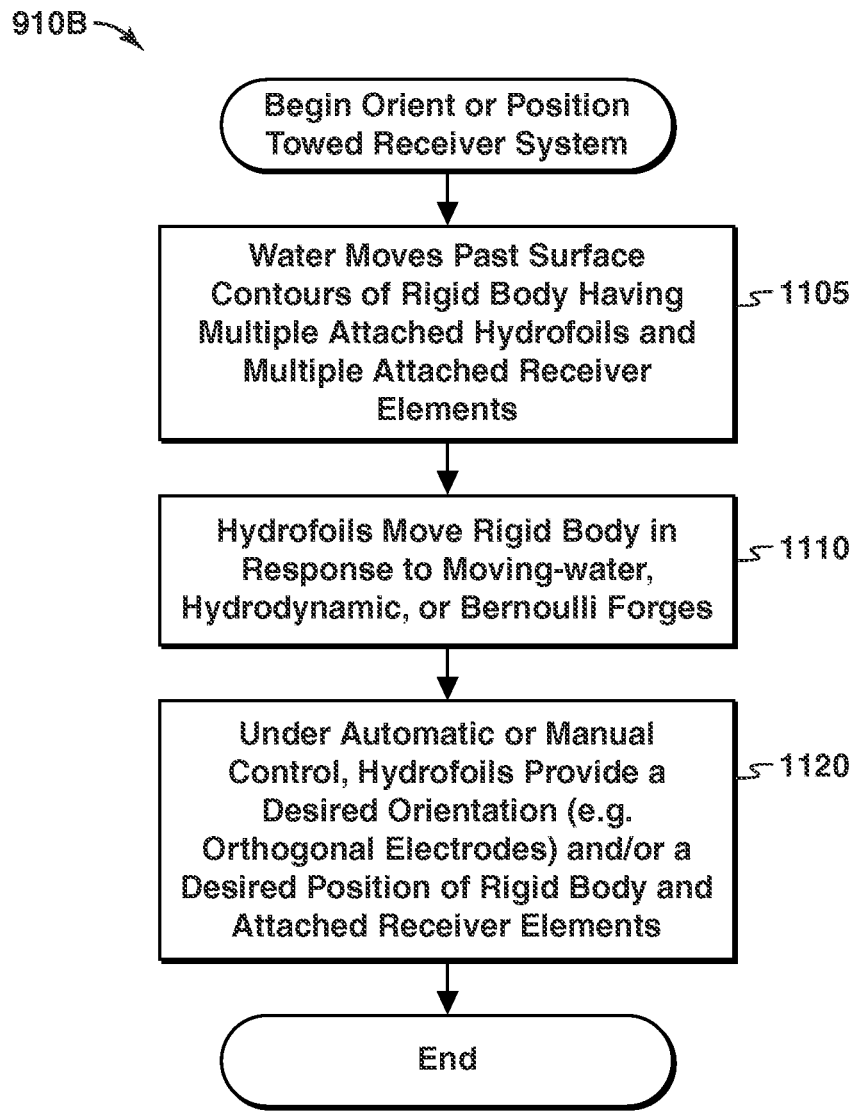
FIG. 11 is a flowchart illustration of an exemplary embodiment of a method for orienting or positioning one or more receiver elements or electrodes of a system that evaluates an underwater formation for hydrocarbon presence or extraction potential.

Referring initially to FIG. 1, an exemplary system 100 for evaluating geology 115, 120 or a petroleum reservoir 120 includes a boat 105 for towing a receiver system 150 in water 110 via a tow cable 125 or a streamer. As discussed in further detail below, the receiver system 150 includes multiple receiver elements 135 that pick up, sense, receive, or detect signals 140 in the water 110. Hydrofoils 130 attached to the receiver elements 135 deploy, orient, configure, or position the individual receiver elements 135 (and/or the receiver system 150 as a whole) to benefit signal detection. The system 100 evaluates the geology 115, 120 via processing the received signals 140. FIG. 8, discussed below, provides a functional block diagram of an exemplary embodiment of the system 100. Meanwhile, FIGS. 9, 10, and 11 present flowcharts for exemplary methods associated with the system 100.

Still referring to FIG. 1, in various exemplary embodiments, the signals 140 can be electrical, voltage, electromagnetic, magnetic, acoustic, pressure, radiation, gravity, ionizing radiation, artificially generated or induced, naturally occurring, perturbed via a manmade stimulus, or emanating from the formation 115, 120, or some combination thereof, to name a few examples. Moreover, the signals 140 can be associated with an electric, magnetic, or gravity field that either varies significantly with time or location or that is essentially uniform. In an exemplary embodiment, the orientation of the receiver elements 135 facilitates collecting inline and broadside geological data (for example resistivity information) in a towed-receiver configuration. Accordingly, the receiver system 150 can assume an orientation that enhances discrimination of a resistive reservoir 120 based on variations in background resistivity signals. In an exemplary embodiment, the system 100 can map sub-seafloor resistivity variations geographically, for example via marine controlled source electromagnetic (CSEM) techniques.

In one exemplary embodiment, the boat 105 tows a signal emitter, and the emitted signals interact with the formation 115, 120 and then return to the receiver system 150, which picks up the interacted signals 140. In one exemplary embodiment, a manmade signal emitter is disposed in the environment, for example on the floor of the body of water 110. In this situation, emitted signals 140 interact with the formation 115, 120 and return to the receiver system 150 for detection. In one exemplary embodiment, the formation 115, 120 is a natural emitter of signals (including one or more fields) that the receiver system 150 detects. In one exemplary embodiment, the formation 115, 120 interacts with or distorts a natural Earth field, and the receiver system 150 detects the distortion.

Exemplary embodiments of the boat 105 can be a marine vessel, a ship, or some other vehicle capable of moving the receiver system 150 in, through, under, or on a body of water 110. In one exemplary embodiment, an aircraft flies or hovers over the body of water 110 and suspends the receiver system in the water 110. The body of water 110 can include a lake, a river, an ocean, a sea, water, freshwater, saltwater, a marine environment, or some other form of aqueous media, for example.

While FIG. 1 depicts the evaluated formation 115, 120 directly under the receiver system 150, in other exemplary embodiments, the formation 115, 120 can be located behind, in front of, or beside the receiver system 150. Further, part or all of the formation 115, 120 can extend under dry land beside the body of water 110.

Figure 2A:
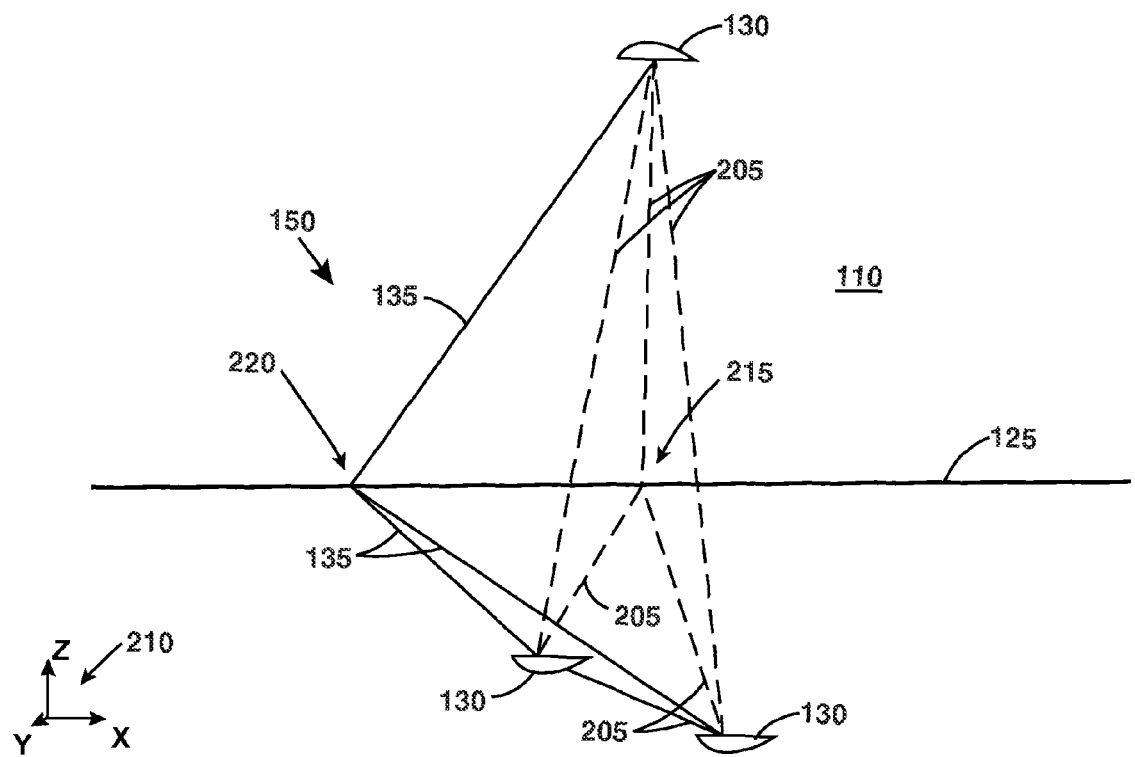
FIG. 2A is an illustration, in perspective view, of an exemplary embodiment of a towed receiver system for detecting one or more signals propagating in water (or a field that is static or dynamic) to provide information about an underwater geological formation.
Figure 2B:
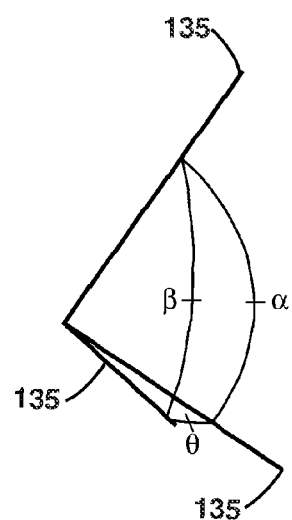
FIG. 2B is an illustration depicting an exemplary configuration for receiver elements or electrodes of an exemplary embodiment of a receiver system that detects signals propagating in water to provide information about an underwater geological formation.
Figure 3:
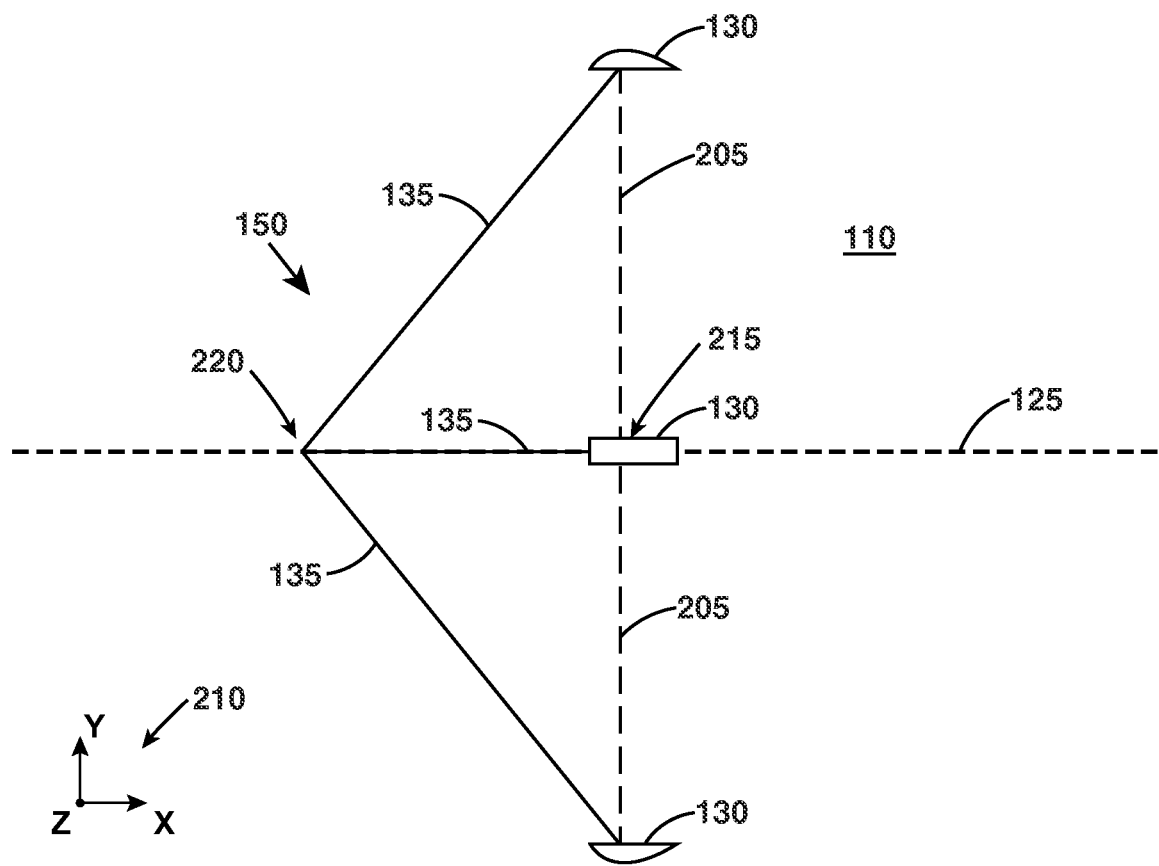
FIG. 3 is an illustration, in overhead view, of an exemplary embodiment of a receiver system for detecting one or more signals propagating in water to provide information about an underwater geological formation.

During operation of the system 100, as depicted in FIGS. 1, 2A, 2B, and 3, the tow cable 125 tows, pulls, drags, or otherwise moves the receiver system 150 through the water 110. FIGS. 2A and 2B depict an exemplary perspective view of the deployed receiver system 150, while FIG. 3 depicts an exemplary top or "bird's eye" view. The coordinate system 210 shows relative orientation of the illustrated receiver system 150 in each figure to provide a visual, perspective aid for the reader.

As will be discussed in further detail below, water 110 moving by the hydrofoils 130 creates forces that move, orient, configure, or position the receiver elements 135 individually and/or systemically to facilitate signal detection. More specifically, the hydrofoils 130 extend the receiver elements 135 to provide predetermined angles α (alpha), β (beta), and θ (theta), as shown exemplarily in FIG. 2B with the tow cable 125 and other items eliminated for illustrative purposes. In an exemplary embodiment, the deployed receiver elements 135 are perpendicular or orthogonal with respect to one another. That is, each of the angles α (alpha), β (beta), and θ (theta) is about 90 degrees, for example within some tolerance of 90 degrees. The receiver elements 135 can be orthogonal physically, geometrically, or from a signal or field perspective.

For example, each receiver element 135 can receive or pick up a vector element or component of the signal 140 that has magnitude and direction. Moreover, in an exemplary embodiment, each receiver element 135 can be sensitive to a different signal phase or a distinct range of phases. The receiver elements 135 can be rotated in processing to provide an $E_x$-$E_y$-$E_z$ detected electric field or voltage. When used with an inline source, the $E_x$ inline component is sensitive to layered resistivity changes associated with the geology 115, 120. Meanwhile the $E_y$ and $E_z$ components are sensitive to three-dimensional effects such as reservoir edges and offline resistivity changes.

In an exemplary embodiment, the tow cable 125 (depicted as a bold solid line in FIG. 2A and as a bold dashed line in FIG. 3 to promote visualization) can be or can include a rope, a towline, a streamer, a wire, a filament, an optical fiber, a shielded signal conductor, or a flexible member, to name a few possibilities. The receiver elements 135 can include wires, cables, filaments, or flexible members that are capable of receiving at least some energy from interaction with the signal 140, which can be either a static field or an electromagnetic wave, as discussed above. In one exemplary embodiment, each of the receiver elements 135 includes an electrode (or multiple electrodes) that picks up electrical energy, voltage, current, field energy, or electromagnetic signals from the water 110. The term "electrode," as used herein, generally refers to a conductor for contacting a medium, such as the water 110, thereby facilitating receipt of electrical energy, voltage, current, field energy, or electromagnetic signals present in the medium.

In the exemplary form of flexible, rope-like members or cables, the proximal (near with respect to the boat 105) ends of the receiver elements 135 attach to a proximal location 220 on the tow cable 125. The distal (far with respect to the boat 105) ends of the receiver elements 135 attach respectively to the hydrofoils 130. When the boat 105 pulls the tow cable 125, the hydrofoils 130 move laterally away from the tow cable 125 in response to Bernoulli forces acting on the hydrofoils 130, thereby extending the receiver elements 135. Thus, the hydrofoils 130 and the receiver elements 135 spread out from the tow cable 125 and from one another.

A system of restraining cables or restraining cable segments 205 limits or constrains the lateral movement of the hydrofoils 130 to provide the desired configuration of the extended receiver elements 135. That is, the restraining cables 205 set the amount of spreading of the hydrofoils 130 and the receiver elements 135. The restraining cables 205 are illustrated as dashed lines merely to aid the reader in visually discriminating the restraining cables 205 from the receiver elements 135. In an exemplary embodiment, restraining cable segments 205 span from a distal location 215 on the tow cable 125 to the hydrofoils 130 and between each of the hydrofoils 130. Accordingly, the extended restraining cable segments 205 form a triangle with each hydrofoil 130 and the distal end of each receiver element 135 disposed at a vertex or point of the triangle.

In an exemplary embodiment, the hydrofoils 130 can have different buoyancies so that the receiver system 150 rotates into a known orientation relative to the formation 115, 120 or relative to Earth gravity. For example, one of the hydrofoils 130 can be weighted so that the weighted hydrofoil 130 is oriented down (submerged the deepest) while the other hydrofoils 130 are oriented relatively upward.

In the exemplary embodiments of electrodes, the receiver elements 135 can have lengths that are provided via trading off an improved signal strength associated with long electrode length to logistical issues (e.g. drag, tangling, etc.) associated with long electrode length. In one exemplary embodiment, each electrode length is about 10 meters.

The lengths of the restraining cables 205 are typically a function of the desired geometrical orientation of the receiver system 150. In an exemplary embodiment, to provide a perpendicular orientation with the receiver elements 135 at the same angle from the tow cable 125, the length of each of the restraining cables 205 that spans between the hydrofoils 130 can have a length of $\sqrt{2}$ (2½) times the length of each receiver element 135. Meanwhile, each restraining cable 205 that extends between a hydrofoil 130 and the tow cable 125 can have a length of $\sqrt{(2/3)}$ times the receiver element length 135. The angle between each receiver element 135 and the tow cable 125 is arcsine($\sqrt{(2/3)}$) or about 55 degrees.

In an exemplary embodiment, the receiver elements 135 can be rotated in processing to a desired x-y-z orientation by first rotating the top receiver element upward by (90°-arcsine ($\sqrt{(2/3)}$)) or approximately 35 degrees, followed by a rotation of 45 degrees in a counterclockwise direction as viewed from above. These rotations can provide an x-component that is inline along the tow cable 125, a y-component that is crossline to the tow cable 125, and a z-component that is upward.

Figure 4:
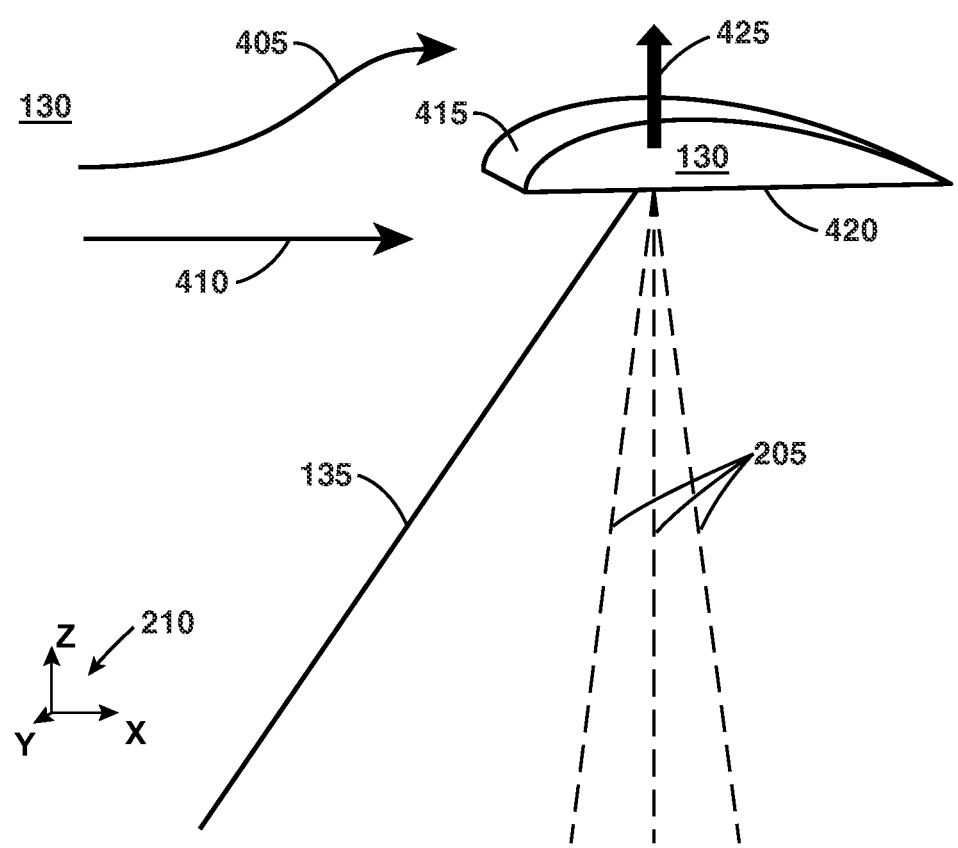
FIG. 4 is an illustration depicting interaction between water and a hydrofoil of an exemplary embodiment of a receiver system for detecting underwater signals.

As shown in FIG. 4, water 405, 410 moves past the hydrofoils 130 as the tow cable 125 pulls the receiver system 150 through the water 110. Each hydrofoil 130 includes two surfaces 415, 420 that contact moving water 405, 410. The surface 415 has a contour that is more curved than the surface 420. That is, the surface 420 is flatter or less convex than the surface 415. The water 405 flowing along the surface 415 travels a greater distance than the water 410 flowing along the surface 420. In accordance with the Bernoulli effect, the moving water 405, 410 provides hydrodynamic force or Bernoulli force 425 generally analogous to lift of an airplane wing. This force 425 translates or moves the hydrofoils 130 into predefined positions, thereby providing a desired receiver configuration as discussed above. In other words, Bernoulli force 425 moves the hydrofoils 130 until the restraining cables 205 counter that force 425, at which point the receiver elements 135 are extended into desired orientations. Accordingly, the hydrofoils 130 spread out via Bernoulli or hydrodynamic forces 425.

In exemplary embodiments, each of the hydrofoils 130 can be or can include a rudder, a wing, a lift surface, a steering surface, a Bernoulli surface, a paravane, a paravane wing, a fin, a wing-like or fin-like member, a device having a flat or curved piece with a surface that reacts to passing water, a surface form creating thrust against water in a direction generally perpendicular to surface, or a propeller (not an exhaustive list).

Figure 5:
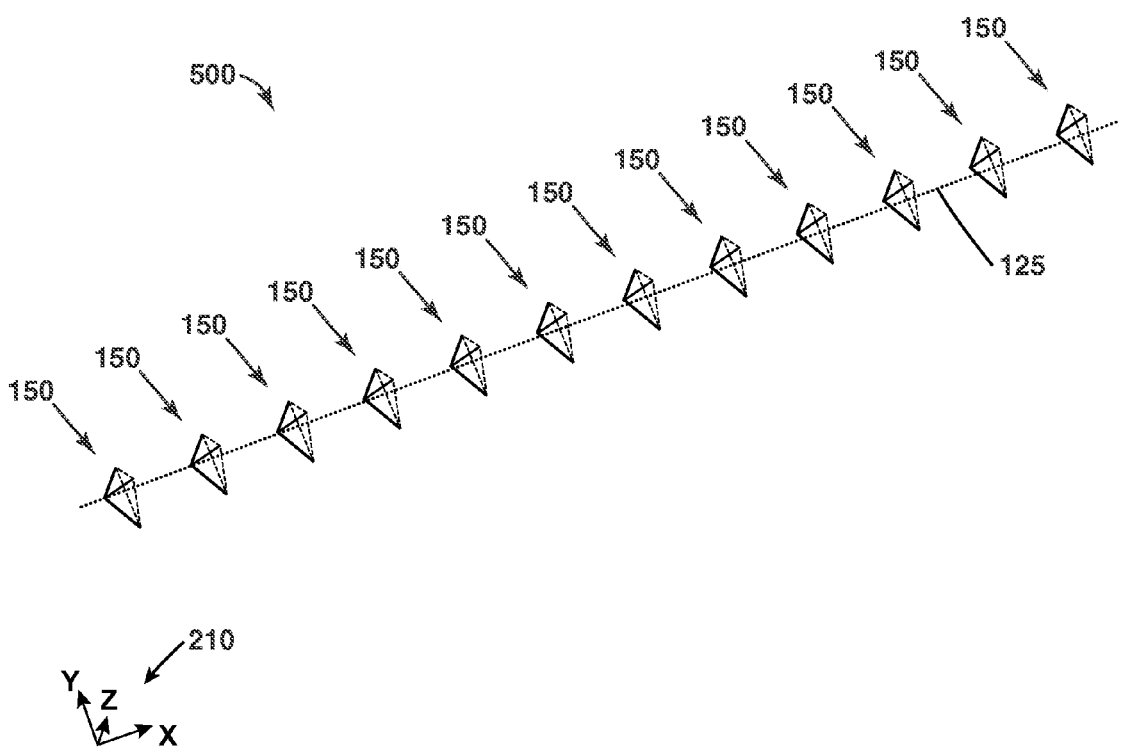
FIG. 5 is an illustration of an exemplary embodiment of a towed array of receivers for detecting underwater signals that may provide geological or hydrocarbon information regarding a geological formation.

Referring to FIG. 5, in an exemplary embodiment, multiple receiver systems 150 can be attached to a single tow cable 125 to provide a towed detector array 500. In an exemplary embodiment, the towed array 500 can be a streamer of receivers, detectors, electrodes, or sensors. The receiver systems 150 can be disposed at periodic or known locations along the tow cable 125, for example to provide a beneficial interaction with one or more signal wavelengths or frequencies of interest of the signal 140 of FIG. 1. In one exemplary embodiment, the receiver systems 150 are equally spaced; alternatively, the spacing can vary along the length of the tow cable 125. That is, the towed array 500 can include a defined pattern of receivers, electrodes, detectors, or other elements interacting with the geological formation.

Figure 6:
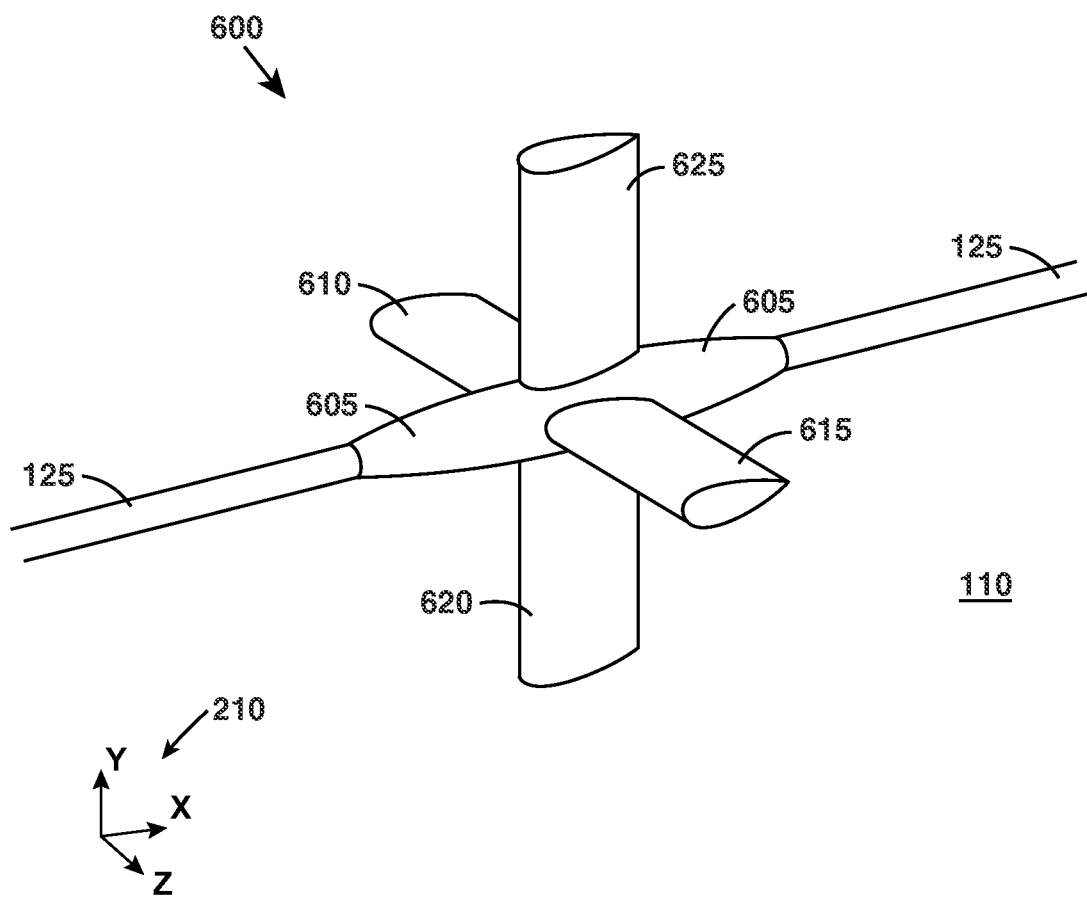
FIG. 6 is a line drawing of an exemplary embodiment of a rigid receiver system for detecting underwater signals that may provide geological or hydrocarbon information about a geological formation.

Referring to FIG. 6, an exemplary embodiment of the system 100 of FIG. 1 can include a rigid receiver system 600 as an alternative to (or in addition to) the previously discussed receiver system 150. The system 600 can be viewed as a paravane, a towed or tethered submarine, a submersible, or as a guided underwater vessel that is connected to an above-water vessel. The rigid receiver system 600 includes two rigid vertical fins 620, 625 and two horizontal fins 610, 615 attached to a main body 605. The main body 605, which can be viewed as a fuselage or a hull, attaches to the tow cable 125 so the boat 105 can propel the rigid receive system 600 underwater.

In one exemplary embodiment, the fins 610, 615, 620, 625 are fixed. Alternatively, one or more of the fins 610, 615, 620, 625 can comprise an active control surface that facilitates controlled steering of the rigid receiver system 600. Such an active control surface can include a rudder or similar steering mechanism, for example. In one exemplary embodiment, a human or computer-based operator in the boat 105 of FIG. 1 can transmit control signals to the rigid receiver system 600. Thus via remote control, the operator can steer the rigid receiver system 600 along a desired path or to provide a defined location relative to another receiving device towed by the boat 105. In one exemplary embodiment, the rigid receiver system 600 includes an onboard control system that moves the control surface autonomously to establish a desired location or path for the system 600. In an exemplary embodiment, the lower fin 620 can be weighted to orient that fin 620 downward, to facilitate steering or to provide sensor orientation.

The rigid receiver system 600 can include one or more detectors, sensors, electrodes, receivers, antennas, instruments, or other means for determining a parameter in the water 110 as potentially relevant to evaluating commercial viability of geology, oil, natural gas, petroleum, or hydrocarbons. In one exemplary embodiment, receiver elements are internal to the rigid receiver system 600, for example to provide electrical isolation from the water 110. Alternatively, the rigid receiver system 600 can include receiver elements that contact the water 110. In one exemplary embodiment, multiple rigid receiver systems 600 are attached to the tow cable 125, and one or more electrodes span between such systems 600.

Figure 7:
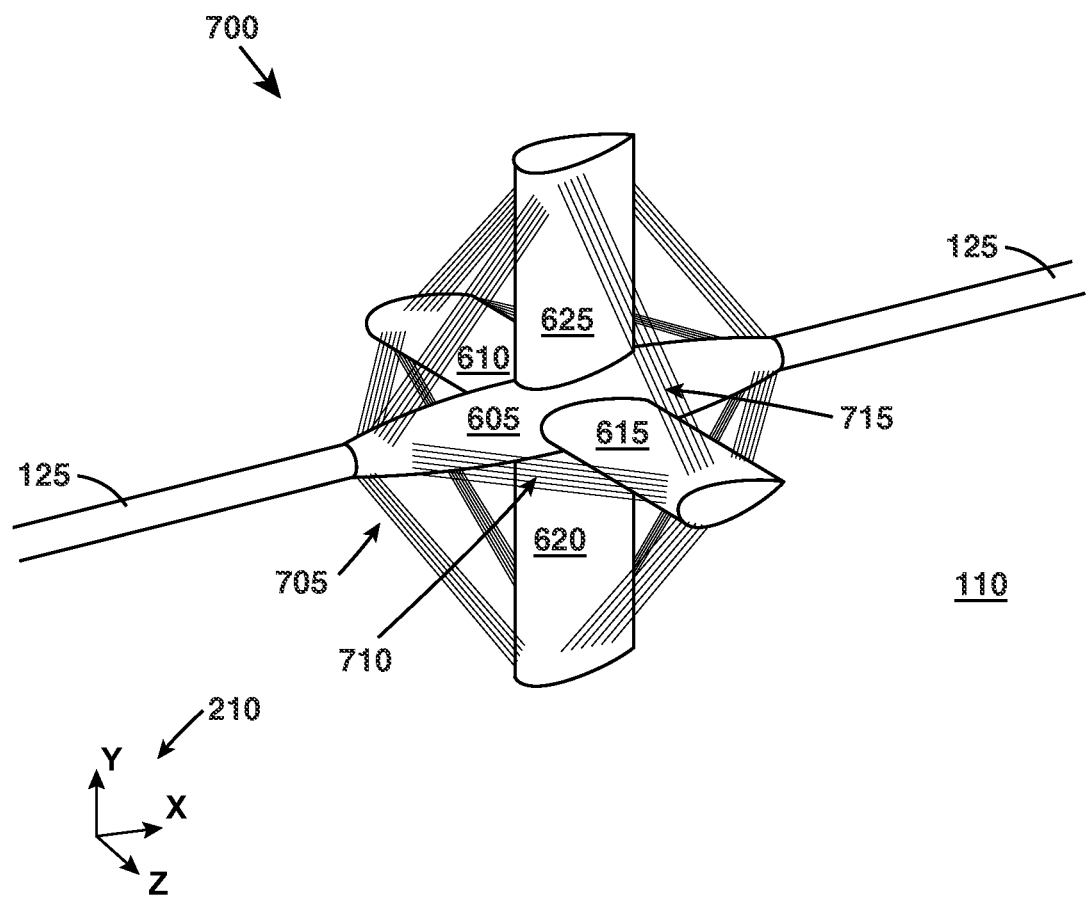
FIG. 7 is a line drawing of an exemplary embodiment of a rigid receiver system for detecting underwater signals that may provide geological or hydrocarbon information about a geological formation, wherein the system comprises coils for magnetic field detection.

FIG. 7 illustrates an exemplary embodiment in which wires 705, 710, 715 are wound around the fins 610, 615, 620, 625 of the rigid receiver system 600 to facilitate magnetic field detection. With the rigid receiver system 700 so outfitted, the system 100 can perform geological or petroleum evaluations via detecting magnetic field variations. The exemplary rigid receiver system 700 of FIG. 7 includes three coils 705, 710, 715, oriented perpendicular to one another, to detect magnetic field strength in three directions. Thus, the coils 705, 710, 715 can split a magnetic field or signal into three orthogonal components or field vectors for analysis.

Additional functional details of the system 100, illustrated in FIG. 1, will now be discussed with reference to FIG. 8, which provides an exemplary functional block diagram for the system 100. The three receiver elements 135 are each sensitive to a distinct aspect of the signal 140, such as each of three orthogonal signal components. Accordingly, the receiver elements 135 produce distinct signals 140A, 140B, 140C that stem from the aggregate signal 140 present in the water 110. The tow cable 125 carries the signals 140A, 140B, 140C to the boat 105, for example via shielded communication cable or via one or more optical fibers.

The boat 105 carries a formation evaluation system 800 that, in an exemplary embodiment, processes received signals, archives data, and interprets geological and signal information to make or to support making decisions about the location of petroleum and the economic feasibility of any located petroleum. That is, the system 800 facilitates profitably operating and managing a petroleum operation that may include exploration, exploratory drilling, drilling for production, petroleum extraction, and production.

The signal processor 805 typically isolates, conditions, and amplifies the signals 140A, 140B, and 140C acquired by the receiver system 150 in preparation for converting those signals 140A, 140B, and 140C from an analog to a digital domain. The analog-to-digital converter 810 digitizes the amplified signals 140A, 140B, 140C to facilitate digital signal processing and/or computer-based analysis. The computing engine 815 can include one or more computers, microprocessors, microcontrollers, digital signal processors, or similar processing units that execute software, firmware, or other digital instructions. Further, in an exemplary embodiment, the computing engine 815 can include a user interface and one or more storage media for holding executed instructions in addition to an archive of acquired signals 140A, 140B, 140C.

The formation evaluation engine 825 can include software routines that process information and make decisions or recommendations. The decisions can be based on acquired signals 140A, 140B, 140C, human input, and/or data from external sources, such as from geological databases.

FIG. 9 illustrates an exemplary process 900 for operating the system 100. Certain steps in the processes described herein must naturally precede others to support appropriate function. However, exemplary embodiments are not necessarily limited to the order of the described steps if such order or sequence does not detrimentally alter the functionality. That is, it is recognized that some steps may be performed before or after other steps or in parallel with other steps.

In an exemplary embodiment of process 900, in step 905, the boat 105 moves the receiver system 150 through water 110, for example via towing as discussed above with reference to FIG. 1. In an exemplary embodiment, towing the receiver system 150 not only moves the receiver system 150 with respect to the formation 115, 120, but also provides a flow of water 110 contacting the receiver system 150.

In an exemplary embodiment, in step 910, the receiver system 150 orients, positions, or moves at least partially in response to force 425 associated with the water flow 405, 410. FIGS. 10 and 11, discussed below, each illustrates exemplary embodiments of step 910 (respectively as process 910A and 910B).

With the receiver system 150 disposed in the orientation, in an exemplary embodiment of step 915, the system's receiver elements 135 (e.g. electrodes) collect one or more signals 140 that are present in the water 110. As discussed above, the signals 140 can be present naturally or present as a result of one more stimuli introduced by the system 100. The signals 140 can include essentially static fields (e.g. a gravity field, a magnetic field, or an electric field associated with voltages generated by or stemming from the formation 115, 120) or traveling waves (e.g. electromagnetic radiation or a flow of energy/power). In an exemplary embodiment, collecting the signals 140 can include transferring at least some energy or power to the receiver elements 135.

In an exemplary embodiment, the tow cable 125 carries the collected signals 140A, 140B, 140C to the boat 105 in step 920. The tow cable 125 may conduct the signals 140A, 140B, 140C electrically, optically, electromagnetically, or via some other transfer to the formation evaluation system 800 on the boat 105.

The formation evaluation system's signal processing circuitry 805 and analog-to-digital converter 810 convert the signals 140A, 140B, 140C to a digital format in an exemplary embodiment of step 925. In one alternative exemplary embodiment, the conversion can occur underwater, for example at the receiver system 150 or in an associated system or subsystem.

In an exemplary embodiment, in step 930, the formation evaluation engine 825 of the formation evaluation system 800 processes the digital signals to evaluate the formation 115, 120. In an exemplary embodiment, evaluating the formation 115, 120 can include petroleum exploration, managing an oil or gas field, or supporting a decision about economic potential of a geographic region. In one exemplary embodiment, the formation evaluation engine 825 includes a computer-based system disposed on the boat 105. In certain alternative embodiments, the engine 825 can include personnel (such as geologists and/or engineers), remote processing capabilities (e.g. a supercomputer linked to the boat via a wireless connection), or an offsite center that may process recorded information stored on a computer-readable medium such as a tape, magnetic disk, or optical disk, to name but a few possibilities. Accordingly, exemplary embodiments of the system 100 that FIGS. 1 and 8 illustrate can include many different components or elements that use, process, or otherwise benefit from information that one or more of the receiver systems 150 obtains.

In an exemplary embodiment, the formation evaluation system 800 includes a computing engine 815 that executes or implements decisions or rules, for example in the form of computer executed instructions or software. That is, the formation evaluation system 800 can include a computing engine 815 that executes or "runs" software routines such as an exemplary embodiment of the formation evaluation engine 825. The formation evaluation engine 825 can include inquiry steps or decision steps such as the exemplary steps 935, 940, and 945 that FIG. 9 illustrates. In other words, exemplary embodiments of the formation evaluation engine 825 can implement many different logical sequences, rules, and decisions, a representative few of which are illustrated in FIG. 9.

In an exemplary embodiment, in step 935, a decision is made regarding whether the formation geology 115, 120 indicates a substantive present of oil, gas, petroleum, or some other economically significant hydrocarbon or material. Moreover, exemplary embodiments of the inquiry can include determining whether petroleum is extractable or recoverable or evaluating how to obtain hydrocarbons profitably. Thus, a process or method performed in whole or in part by the system 100 can include a wide range of steps or decisions that involve a geological evaluation or analysis.

If a determination is made that the formation 115, 120 lacks an economically viable amount of hydrocarbons, then process 900 ends. The acquired data can be archived for future processing, for example to support future analysis based on different petroleum economics (e.g. higher oil prices), more advanced data processing techniques that may become available, or future oil extraction technologies. In an exemplary embodiment, process 900 can iterate steps 905-935, for example scanning a geographic region or ocean floor for exploration. In other words, rather than ending abruptly following a negative determination in step 935, process 900 can continue the cycle of collecting and evaluating geological information.

If the inquiry of step 935 determines that the formation 115, 120 contains an economically significant level of hydrocarbons, for example a petroleum reservoir 120, then step 940 follows step 935. In an exemplary embodiment, in step 935, the formation evaluation engine 825 evaluates whether the formation geology 115, 120 supports exploratory drilling or drilling for profit. If the analysis indicates that the reservoir 120 is not economically viable (for example by virtue of the reservoir 120 being too small or the reservoir's hydrocarbons being inaccessible) then process 900 ends following step 940. As discussed above, process 900 ending can include continuing to scan the geology 115, 120 in search of economically viable hydrocarbons or to support a more detailed data analysis.

If an economically viable petroleum reservoir 120 is indicated, then step 945 follows step 940 in an exemplary embodiment. Beyond finding a petroleum reservoir 120 that had been unknown, in one exemplary embodiment, step 940 executes in response to determining a financially sound approach to extracting petroleum from a known reservoir 120 based on information provided by the receiver system 150. Accordingly, process 900 can include identifying a new reservoir 120, identifying previously unknown information about a known reservoir 120, or determining a profitable approach to extracting hydrocarbons from a known reservoir 120.

In an exemplary embodiment, in step 945, a well is drilled into the geology 115, 120. Drilling the well can include offshore drilling from a platform, for example. The well is completed or readied for production as appropriate based on further testing, for example according to wireline logging, correlation with known geological data, etc. In an exemplary embodiment, the completed well produces hydrocarbons (e.g. oil and/or natural gas). In an exemplary embodiment, more wells are drilled to extract additional hydrocarbons as appropriate. Process 900 ends following step 945, which, in an exemplary embodiment, may proceed for many years. Thus, the information collected by the system 100 can yield a new stream of revenue that may be expansive or that may last for an extended period of time. Accordingly, an exemplary embodiment of the system 100 can produce significant profit.

As discussed above with reference to step 910 of process 900, as illustrated in FIG. 9, hydrodynamic force helps the receiver system 150 deploy into an orientation that is conducive to acquiring underwater signals 140. FIGS. 10 and 11 illustrate flowcharts of two exemplary embodiments of step 910, as process 910A and process 910B respectively.

Referring to process 910A of FIG. 10, in an exemplary embodiment, water 405, 410 moves along or essentially against the surfaces 420, 415 of the hydrofoils 130 of the receiver system 150 in step 1005. In an exemplary embodiment, the moving water 405, 410 produces hydrodynamic force or Bernoulli force 425 in step 1010. That is, the moving water 405, 410 flows along the surfaces 420, 415 of the hydrofoils 130, which can include paravane wings, fins, plates, rudders, etc., and produces forces typically normal or perpendicular to the surface 415. In an exemplary embodiment, in step 1015, the force 425 moves the hydrofoils 130, for example outward with respect to the moving tow cable 125. The moving hydrofoils 130 carry the receiver elements 135 in step 1020 in an exemplary embodiment. That is, the receiver elements 135 can be attached to the hydrofoils 130 so the receiver elements 135 move in collaboration with the hydrofoils 130.

In an exemplary embodiment, in step 1025, the restraining cables 205 limit the lateral motion of the hydrofoils 130 and the receiver elements 135. Thus, the restraining cables 205 hold the hydrofoils 130 to prevent further movement with respect to the tow cable 125 that the boat 105 is towing. Accordingly, the hydrofoils 130 and thus the receiver elements 135 assume predefined locations or orientations with respect to one another. As discussed above, the orientation can include positioning three receiver elements 135 perpendicular to one another, for example like axes of a Cartesian coordinate system.

In step 1030, in an exemplary embodiment, at least one hydrofoil 130 has a different buoyancy so that the receiver elements 135 not only assume defined orientations with respect to one another, but also with respect to the formation 115, 120, or to the environment, or to some other reference. For example, one hydrofoil 130 may be less dense than the others so that it tends to float or otherwise move towards the surface of the water 110. Alternatively, one hydrofoil 130 can be weighted, for example with lead, so that it points essentially downward. In an exemplary embodiment, process 910A ends following step 1030, and process 900 of FIG. 9 continues thereafter with step 915.

As discussed above, process 910B, which FIG. 11 illustrates in flowchart form, is an alternative to the exemplary embodiment of step 910 that FIG. 10 depicts as process 910A. Process 910B of FIG. 11 will be discussed with exemplary reference to FIGS. 6 and 7.

In an exemplary embodiment, in step 1105 of process 910B, water 405, 410 moves by (and typically contacts) the surface contours of a rigid receiver system 600, 700. The rigid receiver system 600, 700 includes multiple hydrofoils, protrusions, or fins 610, 615, 620, 625 that interact with the flowing water 405, 410. At least one receiver element 135, 705, 710, 715 is attached to the rigid receiver system 600, 700, for example a sensor, detector, electrode, instrument, antenna, etc.

In step 1110, moving water 405, 410 applies force 425 to the hydrofoils 610, 615, 620, 625, thereby generating motion in an exemplary embodiment. The motion can include up, down, left, right, forward, or backward movement. Moreover, the motion can include rotation or tilting motion. In one exemplary embodiment the applied forces 425 help stabilize the rigid receiver system 600, 700, for example preventing unwanted oscillations or movements.

In an exemplary embodiment, in step 1120, the hydrofoils 610, 615, 620, 625 provide a desired or intended orientation and/or a desired position for the rigid receiver system 600, 700. Accordingly, the attached receiver elements 135, 705, 710, 715 assume an orientation that provides beneficial interaction with the formation 115, 120 and/or with signals 140 present in the water 110. Moreover, the rigid receiver system 600 can follow a path that changes or a configurable path relative to the boat 105 or relative to some other towed item or receiver. In an exemplary embodiment, process 910B ends following step 1120, and process 900 continues thereafter with step 915 as discussed above with reference to FIG. 9.

A method for evaluating an underwater geological formation has been described that includes towing a plurality of hydrofoils with a boat, wherein force associated with moving water disposes the towed plurality of hydrofoils with respect to one another; collecting signals, emanating from the geological formation, via signal receptors attached to the plurality of towed hydrofoils; and determining information about the geological formation from the collected signals. In an exemplary embodiment, towing the plurality of hydrofoils comprises towing paravanes. In an exemplary embodiment, towing the plurality of hydrofoils comprises towing a streamer means to which the plurality of hydrofoils is attached. In an exemplary embodiment, the force comprises Bernoulli force produced by water moving by the towed hydrofoils. In an exemplary embodiment, determining information about the geological formation comprises evaluating whether the geological formation contains a threshold level of hydrocarbons. In an exemplary embodiment, determining information about the geological formation comprises prospecting for petroleum. In an exemplary embodiment, determining information about the geological formation comprises deciding whether to drill a well into the geological formation. In an exemplary embodiment, determining information about the geological formation comprises making a decision about extracting a hydrocarbon from the formation. In an exemplary embodiment, towing the plurality of hydrofoils includes towing a first hydrofoil attached to a first signal receptor; towing a second hydrofoil attached to a second signal receptor; and towing a third hydrofoil attached to a third signal receptor, and disposing the towed hydrofoils with respect to one another includes disposing the first, second, and third signal receptors in an essentially orthogonal orientation. In an exemplary embodiment, towing the plurality of hydrofoils includes towing a first hydrofoil attached to a first signal receptor; towing a second hydrofoil attached to a second signal receptor; and towing a third hydrofoil attached to a third signal receptor; and disposing the towed hydrofoils with respect to one another includes disposing the first, second, and third signal receptors to provide an electrical orientation that is essentially orthogonal. In an exemplary embodiment, each of the signal receptors includes an electrode. In an exemplary embodiment, each of the signal receptors includes a flexible line spanning from a streamer to a respective one of the plurality of hydrofoils. In an exemplary embodiment, each of the signal receptors includes a flexible electrode, and disposing the towed hydrofoils includes orienting at least three of the flexible electrodes essentially at right angles with respect to one another. In an exemplary embodiment, collecting signals emanating from the geological formation includes detecting electromagnetic signals propagating in water.

A method for hydrocarbon exploration has been described that includes in response to towing first, second, and third electrodes with a boat, disposing the first electrode, the second electrode, and the third electrode at essentially right angles with respect to one another; and evaluating an area for hydrocarbons based on signals received by the towed first, second, and third electrodes. In an exemplary embodiment, the method further includes in response to evaluating the area, drilling a well in the area for extracting at least some of the hydrocarbons. In an exemplary embodiment, the method further includes completing the well and extracting at least some of the hydrocarbons via the well. In an exemplary embodiment, the method further includes drilling additional wells in the area. In an exemplary embodiment, the method further includes completing the additional wells and extracting additional hydrocarbons from the additional wells. In an exemplary embodiment, the received signals include electromagnetic or electrical signals propagating in water essentially below the boat. In an exemplary embodiment, the received signals include signals emanating from a geological formation in the area under water upon which the boat floats. In an exemplary embodiment, disposing the first electrode, the second electrode, and the third electrode at essentially right angles with respect to one another includes establishing an essentially orthogonal orientation for the first electrode, the second electrode, and the third electrode. In an exemplary embodiment, disposing the first electrode, the second electrode, and the third electrode at essentially right angles with respect to one another includes one or more hydrofoils moving the first electrode, the second electrode, and the third electrode into a desired orientation. In an exemplary embodiment, disposing the first electrode, the second electrode, and the third electrode at essentially right angles with respect to one another includes moving each of the first electrode, the second electrode, and the third electrode along a respective prescribed path in water. In an exemplary embodiment, towing the first, second, and third electrodes includes pulling the first, second, and third electrodes with a common cable. In an exemplary embodiment, disposing the first electrode, the second electrode, and the third electrode at essentially right angles with respect to one another includes constraining the first electrode, the second electrode, and the third electrode with a cable having a triangular configuration. In an exemplary embodiment, towing the first, second, and third electrodes includes towing three paravanes. In an exemplary embodiment, each of the first, second, and third electrodes includes a cable that is receptive to electrical or electromagnetic signals carrying information about the hydrocarbons. In an exemplary embodiment, the first electrode includes a first strand of flexible material, the second electrode includes a second strand of flexible material, the third electrode includes a third strand of flexible material, and disposing the first electrode, the second electrode, and the third electrode at essentially right angles with respect to one another includes disposing the first strand, the second strand, and the third strand at essentially right angles with respect to one another. In an exemplary embodiment, disposing the first electrode, the second electrode, and the third electrode at essentially right angles with respect to one another includes constraining the first electrode, the second electrode, and the third electrode with a first cable that extends to form a perimeter of a triangle; extending the first electrode from a second cable to a first vertex of the triangle; extending the second electrode from the second cable to a second vertex of the triangle; and extending the third electrode from the second cable to a third vertex of the triangle.

A method for detecting an electromagnetic signal propagating in an aqueous medium has been described that includes attaching to a cable a first means for signal detection, a second means for signal detection, and a third means for signal detection; pulling the cable through the water; providing an essentially orthogonal orientation for the first means for signal detection, the second means for signal detection, and the third means for signal detection; and detecting the electromagnetic signal via the first means for signal detection picking up a first component of the electromagnetic signal, the second means for signal detection picking up a second component of the electromagnetic signal, and the third means for signal detection picking up a second component of the electromagnetic signal. In an exemplary embodiment, the first component, the second component, and the third component are essentially perpendicular to one another electrically or electromagnetically. In an exemplary embodiment, the first means for signal detection, the second means for signal detection, and the third means for signal detection are attached to a common rigid body that is submerged in the water and that comprises at least one hydrofoil. In an exemplary embodiment, the first means for signal detection, the second means for signal detection, and the third means for signal detection are attached to a paravane that is submerged in the water. In an exemplary embodiment, the first means for signal detection, the second means for signal detection, and the third means for signal detection are attached to a submerged rigid member. In an exemplary embodiment, each of the first means for signal detection, the second means for signal detection, and the third means for signal detection comprises an electrode integrated in a cable.

A method for determining information about a formation disposed under a body of water has been described that includes moving a first receiver along a first path through the water; moving a second receiver along a second path, displaced from the first path by a distance, through the water; changing the distance in response to a force applied by the water to the first receiver or the second receiver; and determining the information in response to the first moving receiver and the second moving receiver receiving a signal present in the water. In an exemplary embodiment, the force comprises a Bernoulli force. In an exemplary embodiment, the applied force is speed dependent. In an exemplary embodiment, changing the distance comprises tilting a vane or a fin that is attached to the first receiver or the second receiver. In an exemplary embodiment, changing the distance comprises adjusting a wing of a paravane. In an exemplary embodiment, changing the distance comprises moving a rudder attached to the first receiver while the first receiver is moving along the first path. In an exemplary embodiment, the distance comprises a horizontal distance and a vertical distance, and wherein changing the distance comprises changing the horizontal distance. In an exemplary embodiment, the distance comprises a horizontal distance and a vertical distance, and wherein changing the distance comprises changing the vertical distance. In an exemplary embodiment, the distance comprises a horizontal distance and a vertical distance, and wherein changing the distance comprises changing the horizontal distance and the vertical distance. In an exemplary embodiment, the first receiver and the second receiver are submerged different depths under the water. In an exemplary embodiment, the first path and the second path are different distances above the formation. In an exemplary embodiment, a portion of the first path is disposed at a surface of the water. In an exemplary embodiment, moving the first receiver along the first path through the water comprises towing a first paravane with a boat, and wherein moving the second receiver along the second path through the water comprises towing a second paravane with the boat while towing the first paravane. In an exemplary embodiment, moving the first receiver includes pulling a first paravane through the water, moving the second receiver includes pulling a second paravane through the water, and the first paravane and the second paravane have different buoyancies. In an exemplary embodiment, moving the first receiver includes moving a first paravane through the water, moving the second receiver includes moving a second paravane through the water, and the method further includes constraining the distance via a cable attached between the first paravane and the second paravane. In an exemplary embodiment, the step of towing the first receiver and the second receiver essentially behind a boat. In an exemplary embodiment, the method further includes the collecting electrical information from the formation via the first receiver and the second receiver. In an exemplary embodiment, the method further includes determining resistivity information about the formation based on signals received by first receiver and the second receiver. In an exemplary embodiment, the method further includes moving a third receiver along a third path through the water, the first receiver includes a first electrode, the second receiver includes a second electrode, and the third receiver includes a third electrode, and the first electrode, the second electrode, and the third electrode are disposed at approximate right angles relative to one another. In an exemplary embodiment, the first receiver includes a first electrode and the second receiver includes a second electrode, and the first electrode and the second electrode are electrically perpendicular to one another. In an exemplary embodiment, the first receiver and the second receiver are disposed at a right angle relative to one another. In an exemplary embodiment, the first receiver and the second receiver are attached to a common cable, and changing the distance includes establishing an essentially uniform separation between the first receiver and the second receiver. In an exemplary embodiment, the method further comprises processing the information to evaluate whether the formation contains hydrocarbons. In an exemplary embodiment, the method further comprises estimating a level of hydrocarbons present in the formation in response to processing the information with software; and if the estimated level of hydrocarbons meets a criterion, drilling a hole in the formation and extracting hydrocarbons from the formation via the drilled hole.

A method for receiving an electrical signal moving through water has been described that includes in response to a vessel towing a line, establishing an approximately orthogonal orientation under the water for a first electrically receptive member, a second electrically receptive member, and a third electrically receptive member; and transferring energy from the electrical signal to at least one of the first electrically receptive member, the second electrically receptive member and the third electrically receptive member. In an exemplary embodiment, the first electrically receptive member includes a first flexible electrode, the second electrically receptive member includes a second flexible electrode, and the third electrically receptive member includes a third flexible electrode. In an exemplary embodiment, the first electrically receptive member includes a first conductive filament, the second electrically receptive member includes a second conductive filament, and the third electrically receptive member includes a third conductive filament. In an exemplary embodiment, the approximately orthogonal orientation includes a geometrically orthogonal orientation. In an exemplary embodiment, the approximately orthogonal orientation includes an electrical orientation that is essentially orthogonal. In an exemplary embodiment, the first electrically receptive member includes a first cable that receives electromagnetic signals, the second electrically receptive member includes a second cable that receives electromagnetic signals, and the third electrically receptive member includes a third cable that receives electromagnetic signals.

A system for evaluating oil or gas content of a geological formation located under a body of water has been described that includes a streamer comprising a series of receivers disposed at various locations along a main line; a boat for towing the steamer in the body of water; and a system for processing signals detected by the series of receivers to evaluate the oil or gas content, wherein each of the receivers includes a proximal attachment site and a distal attachment site on the main line; a first flexible electrode extending from the proximal attachment site to a first paravane wing; a second flexible electrode extending from the proximal attachment site to a second paravane wing; a third flexible electrode extending from the proximal site to a third paravane wing; a first restraining cable extending from the distal attachment site to the first paravane wing; a second restraining cable extending from the distal attachment site to the second paravane wing; a third restraining cable extending from the distal attachment site to the third paravane wing; a fourth restraining cable extending from the first paravane wing to the second paravane wing; a fifth restraining cable extending from the second paravane wing to the third paravane wing; and a sixth restraining cable extending from the third paravane wing to the first paravane wing, and wherein the fourth, fifth, and sixth restraining cables form a triangle when the boat tows the streamer in the body of water, with an end of the first electrode disposed at a first vertex of the triangle, an end of the second electrode disposed at a second vertex of the triangle, and an end of the third electrode disposed at a third vertex of the triangle. In an exemplary embodiment, an end of the first restraining cable is disposed at the first vertex, an end of the second restraining cable is disposed at the second vertex, and an end of the third restraining cable is disposed at the third vertex when the boat tows the streamer in the body of water. In an exemplary embodiment, the first paravane wing, the second paravane wing, and the third paravane wing are operative to dispose the first electrode, the second electrode, and the third electrode in an essentially orthogonal orientation in response to the boat towing the streamer. In an exemplary embodiment, the first paravane wing, the second paravane wing, and the third paravane wing are operative to dispose the first electrode, the second electrode, and the third electrode approximately perpendicular to one another. In an exemplary embodiment, the first, second, and third paravane wings are operative to orient the first, second, and third electrodes at approximately right angles with respect to one another via Bernoulli force.

A system for determining geological information via detecting a signal in water has been described that includes means for towing a first signal detector and a second signal detector through the water; and means for orienting the towed first signal detector at a predetermined angle relative to the towed second signal detector via water, moving by the towed first signal detector and the towed second signal detector, producing hydrodynamic force. In an exemplary embodiment, the oriented first signal detector includes first means for detecting a first electromagnetic component of the signal, the oriented second signal detector includes second means for detecting a second electromagnetic component of the signal, and the first electromagnetic component is essentially orthogonal to the second electromagnetic component. In an exemplary embodiment, the first signal detector includes first means for detecting a first electrical field associated with the signal, and the second oriented signal detector includes second means for detecting a second electrical field associated with the signal and perpendicular to the first electrical field. In an exemplary embodiment, the first signal detector includes an electrode, the second signal detector includes another electrode, and the predetermined angle is approximately a right angle. In an exemplary embodiment, the means for towing includes a steamer having an array of signal detector clusters spaced along the streamer, and wherein one of the signal detector clusters includes the first signal detector and the second signal detector.

A method for determining whether to drill a well into an underwater geological formation has been described that includes providing a plurality of electromagnetic signal detectors; towing a plurality of submerged hydrofoils though water with a boat, wherein each of the hydrofoils has a respective one of the electromagnetic signal detectors attached thereto; orienting the plurality of electromagnetic signal detectors into a predefined configuration in response to force of water moving past the towed plurality of submerged hydrofoils; receiving electromagnetic signals propagating in the water; inferring information about the underwater geological formation based on the received electromagnetic signals; and if the inferred information indicates that the underwater geological formation contains an amount of hydrocarbons, drilling the well. In an exemplary embodiment, the method further includes extracting the hydrocarbons from the underwater geological formation via operating the drilled well.

A system for evaluating underwater geology has been described that includes means for providing moving water; means for generating Bernoulli force from the moving water; means for moving a submerged plurality of signal receptors into a predetermined orientation based on the generated Bernoulli force; and means for evaluating the underwater geology based on signals received by the submerged plurality of signal receptors. In an exemplary embodiment, the predetermined orientation comprises an orthogonal configuration of the signal receptors.

A system for receiving an electrical signal moving through water has been described that includes means for establishing an approximately orthogonal orientation under the water for a first electrically receptive member, a second electrically receptive member, and a third electrically receptive member; and means for transferring energy from the electrical signal to at least one of the first electrically receptive member, the second electrically receptive member, and the third electrically receptive member. In an exemplary embodiment, each of the first electrically receptive member, the second electrically receptive member, and the third electrically receptive member includes an electrically receptive cable.

A system for determining information about a formation disposed under a body of water has been described. In an exemplary embodiment, the system includes means for moving a first receiver along a first path through the water; means for moving a second receiver along a second path, displaced from the first path by a distance, through the water; means for changing the distance in response to a force applied by the water to the first receiver or the second receiver; and means for determining the information in response to the first moving receiver and the second moving receiver receiving at least a portion of the information. In an exemplary embodiment, the system includes a means for constraining the changed distance.

A system for hydrocarbon exploration has been described. In an exemplary embodiment, the system includes means for moving first electrode means, second electrode means, and third electrode means through water; means for disposing the first electrode means, the second electrode means, and the third electrode means at essentially right angles with respect to one another in the water; and means for evaluating an area for hydrocarbons based on signals received by the first, second, and third electrode means.

Although illustrative embodiments have been shown and described, the foregoing contemplates a wide range of modifications, changes and substitutions. In some instances, some disclosed features may be employed without a corresponding use of the other disclosed features. In other instances, the disclosed elements will be combined or arranged based on understanding gained from this disclosure coupled with ordinary skill in the art. Moreover, from the description of exemplary embodiments, equivalents of the elements explicitly shown will suggest themselves to those of skill in the art, and ways of constructing other embodiments will appear to practitioners of the art. Accordingly, it is appropriate that the appended claims be construed broadly.

What is claimed is:

1. A method for evaluating an underwater geological formation, comprising:
   towing a plurality of hydrofoils with a boat, wherein force associated with moving water disposes the towed plurality of hydrofoils with respect to one another;
   collecting signals, emanating from the geological formation, via signal receptors attached to the towed plurality of hydrofoils; and
   determining information about the geological formation from the collected signals;
   wherein towing the plurality of hydrofoils comprises:
   towing a first hydrofoil attached to a first signal receptor;
   towing a second hydrofoil attached to a second signal receptor; and
   towing a third hydrofoil attached to a third signal receptor, and
   wherein disposing the towed hydrofoils with respect to one another comprises disposing the first, second, and third signal receptors in an essentially orthogonal orientation.

2. The method of claim 1, wherein determining information about the geological formation comprises evaluating whether the geological formation contains a threshold level of hydrocarbons.

3. The method of claim 1, wherein determining information about the geological formation comprises deciding whether to drill a well into the geological formation.

4. The method of claim 1, wherein each of the signal receptors comprises an electrode.

5. The method of claim 1, wherein each of the signal receptors comprises a flexible electrode, and wherein disposing the towed plurality of hydrofoils comprises orienting at least three of the flexible electrodes essentially at right angles with respect to one another.

6. The method of claim 1, wherein collecting signals emanating from the geological formation comprises detecting electromagnetic signals propagating in water.

7. The method of claim 1, wherein said first signal receptor comprises a first electrode, said second signal receptor comprises a second electrode, and said third signal receptor comprises a third electrode; and
   wherein in response to the towing of the first, second, and third hydrofoils, the first electrode, the second electrode, and the third electrode are disposed at essentially right angles with respect to one another; and further comprising:
   evaluating the geological formation for hydrocarbons based on electromagnetic vector component signals received by the towed first, second, and third electrodes.

8. The method of claim 7, further comprising in response to evaluating the geological formation, drilling a well in the geological formation for extracting at least some of the hydrocarbons.

9. The method of claim 7, wherein disposing the first electrode, the second electrode, and the third electrode at essentially right angles with respect to one another comprises the first, second, and third hydrofoils moving the first electrode, the second electrode, and the third electrode into a desired orientation.

10. The method of claim 7, wherein towing the first, second, and third hydrofoils comprises pulling the first, second, and third hydrofoils with a common cable.

11. The method of claim 7, wherein the first electrode comprises a first strand of flexible material,
   wherein the second electrode comprises a second strand of flexible material,
   wherein the third electrode comprise a third strand of flexible material, and
   wherein disposing the first electrode, the second electrode, and the third electrode at essentially right angles with respect to one another comprises disposing the first strand, the second strand, and the third strand at essentially right angles with respect to one another.

12. The method of claim 7, wherein disposing the first electrode, the second electrode, and the third electrode at essentially right angles with respect to one another comprises:
   constraining the first electrode, the second electrode, and the third electrode with a first cable that extends to form a perimeter of a triangle;
   extending the first electrode from a second cable to a first vertex of the triangle;
   extending the second electrode from the second cable to a second vertex of the triangle; and
   extending the third electrode from the second cable to a third vertex of the triangle;

wherein said first and second cables provide the right angle configuration of the electrodes by constraining movement of the first, second, and third hydrofoils, said cables having lengths that are a function of the right angle configuration of the electrodes.

13. The method of claim 1, wherein distance between the first signal receptor and the second signal receptor changes as they are towed through the water
   in response to a force applied by the water to the first hydrofoil or the second hydrofoil.

14. The method of claim 13, wherein the force comprises a Bernoulli force.

15. The method of claim 13, wherein changing the distance comprises tilting a vane or a fin that is attached to the first hydrofoil or the second hydrofoil.

16. The method of claim 13, wherein each hydrofoil comprises a paravane, and changing the distance comprises adjusting a wing of a paravane.

17. The method of claim 13, wherein the distance comprises a horizontal distance and a vertical distance, and wherein changing the distance comprises changing the horizontal distance and the vertical distance.

18. The method of claim 12, wherein evaluating the geological formation for hydrocarbons comprises rotating the electrodes in data processing to provide x, y and z components of the electric field.

* * * * *